(12) United States Patent
Sperlich et al.

(10) Patent No.: US 9,130,792 B2
(45) Date of Patent: Sep. 8, 2015

(54) CLOSED-LOOP HIGH-SPEED CHANNEL EQUALIZER ADAPTATION

(71) Applicant: TEXAS INSTRUMENTS INCORPORATED, Dallas, TX (US)

(72) Inventors: Roland Sperlich, Rockwall, TX (US); Huanzhang Huang, Plano, TX (US); Charles M. Branch, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/299,187

(22) Filed: Jun. 9, 2014

(65) Prior Publication Data

US 2014/0362900 A1    Dec. 11, 2014

Related U.S. Application Data

(60) Provisional application No. 61/833,318, filed on Jun. 10, 2013.

(51) Int. Cl.
*H03K 5/159* (2006.01)
*H04L 25/02* (2006.01)
*H04B 3/14* (2006.01)

(52) U.S. Cl.
CPC .............. *H04L 25/026* (2013.01); *H04B 3/144* (2013.01)

(58) Field of Classification Search
CPC ....................................................... H04B 3/144
USPC ........................................................... 375/232
See application file for complete search history.

(56) References Cited

U.S. PATENT DOCUMENTS

| | | | | | |
|---|---|---|---|---|---|
| 4,677,647 | A | * | 6/1987 | Aoyagi | 375/344 |
| 6,002,723 | A | * | 12/1999 | Chethik | 375/317 |
| 7,787,564 | B1 | * | 8/2010 | Anvari | 375/297 |
| 8,396,105 | B2 | * | 3/2013 | Gerfers et al. | 375/232 |
| 2010/0079216 | A1 | * | 4/2010 | Sakano | 333/2 |
| 2011/0124304 | A1 | * | 5/2011 | Tsuchiya et al. | 455/127.1 |
| 2014/0073257 | A1 | * | 3/2014 | Tujkovic et al. | 455/63.1 |

* cited by examiner

*Primary Examiner* — Santiago Garcia
(74) *Attorney, Agent, or Firm* — Tuenlap D. Chan; Frank D. Cimino

(57) ABSTRACT

A serial communication circuit (FIG. 3) is disclosed. The circuit includes an equalizer circuit (306) arranged to receive a data signal (CH 1) and produce an equalized data signal. A log detector circuit (300) receives the data signal and produces a power signal indicating a power level of the data signal. A decision circuit (332) receives the power signal and produces a select signal. A first selection circuit (336) receives a plurality of first correction signals and applies one of the first correction signals to the equalizer circuit in response to the select signal.

2 Claims, 5 Drawing Sheets

CLOSED-LOOP HIGH-SPEED CHANNEL EQUALIZER ADAPTATION

CLAIM TO PRIORITY OF NONPROVISIONAL APPLICATION

This application claims the benefit under 35 U.S.C. §119 (e) of Provisional Appl. No. 61/833,318 (TI-72906PS), filed Jun. 10, 2013, which is incorporated herein by reference in its entirety.

BACKGROUND OF THE INVENTION

Embodiments of the present invention relate to a closed-loop, high-speed adaptive channel equalization for serial data communication.

Wireline serial communication systems are widely used for applications such as High-Definition Multimedia Interface (HDMI) systems, Digital Versatile Disc (DVD) players, and audio-visual (AV) systems. A major concern in such applications is the limited channel bandwidth, which causes inter-symbol interference and distortion for binary serial data such as no-return-to-zero (NRZ) and return-to-zero (RZ) sequences. This is further complicated by different cable lengths that may be used in different communication systems. Channel equalization is widely used in these serial communication systems to compensate for limited channel bandwidth as described by Sakano in U.S. Pub. No. 2010/0079216, filed Sep. 18, 2009, and incorporated by reference herein in its entirety. Channel equalization may be performed at the transmitter or the receiver or both in serial data communication systems. When performed at the transmitter, data is typically predistorted by amplifying the high frequency components of the data to compensate for the low-pass characteristic of the channel. When performed at the receiver, low frequency components of received data may be attenuated or high frequency components may be amplified by a channel equalizer to compensate for data distortion.

FIG. 1 is a typical serial data communication receiver as disclosed by Gerfers et al. in U.S. Pat. No. 8,396,105, filed Mar. 12, 2013, and incorporated by reference herein in its entirety. The circuit comprises an adaptable equalizer 10, a plurality of sampling amplifiers or samplers 12, a digital post-processing circuit 14, and a clock recovery circuit 16. A circuit input 11 receives serial data over a data channel and applies it to an input of equalizer 10, which has an output coupled to each of sampling amplifiers 12. Outputs from sampling amplifiers 12 are coupled to digital post-processing circuit 14. Digital post processing circuit 14 has one output coupled to a setting input of equalizer 10. Clock recovery circuit 16 has outputs coupled to sampling amplifiers 12. An input of clock recovery circuit 10 may be coupled to circuit input 11 or to a clock reference. FIG. 1B is an example of different equalizer 10 transfer characteristics. The transfer characteristics are determined by filter coefficients provided from post-processing circuit 14. Equalizers are well known in the art and may comprise various cascade configurations such as two high pass filters and an all pass filter, two band pass filters and a low pass filter, and various other high, low, or band pass filters at different positions in the cascade. These filters may be analog or digital. When equalizer 10 comprises analog filters, processing circuit 14 alters the filter's time constant to tune the filter transfer characteristic.

FIG. 2A is a typical example of distorted serial data bits that may be received at input 11 of the receiver of FIG. 1A. The channel acts as a low pass filter to selectively attenuate high frequency components of the serial data stream. In general, the distortion is greater for longer cable lengths and higher transmit frequencies. FIG. 2B shows a typical example of the received serial data bits of FIG. 2A after equalization. A goal of channel equalization is to effectively complement the channel transfer characteristic by acting as a high pass filter, so that data bits are properly decoded and bit error rate (BER) is reduced. One of the problems with channel equalization, however, is that all channel characteristics are not the same. Moreover, different cable lengths, data patterns, and frequency significantly affect received power and serial data distortion.

While preceding approaches may provide improvements in high-speed serial data equalization, the present invention is directed to further improvements in speed, throughput, and an improved error rate. Accordingly, the preferred embodiments described below are directed toward improving upon the prior art.

BRIEF SUMMARY OF THE INVENTION

In a preferred embodiment of the present invention, a serial communication circuit is disclosed. The circuit includes an equalizer circuit coupled to receive a data signal and produce an equalized data signal. A log detector circuit receives the data signal and produces a power signal indicating a power level of the data signal. A decision circuit receives the power signal and produces a select signal. A first selection circuit receives a plurality of first correction signals and applies one of the first correction signals to the equalizer circuit in response to the select signal.

DETAILED DESCRIPTION OF THE INVENTION

The preferred embodiments of the present invention provide significant advantages over serial communication circuits of the prior art as will become evident from the following detailed description.

Figure 1A:
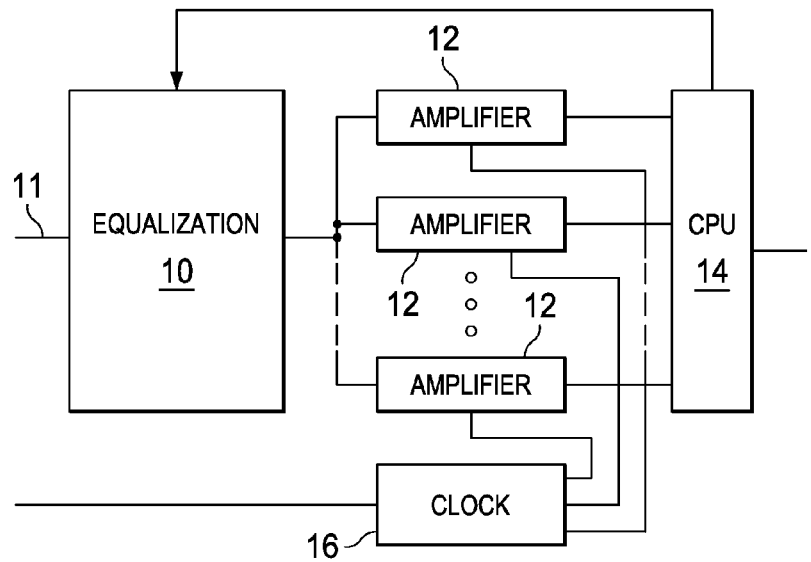
FIG. 1A is a circuit diagram of a data communication circuit of the prior art.
Figure 1B:
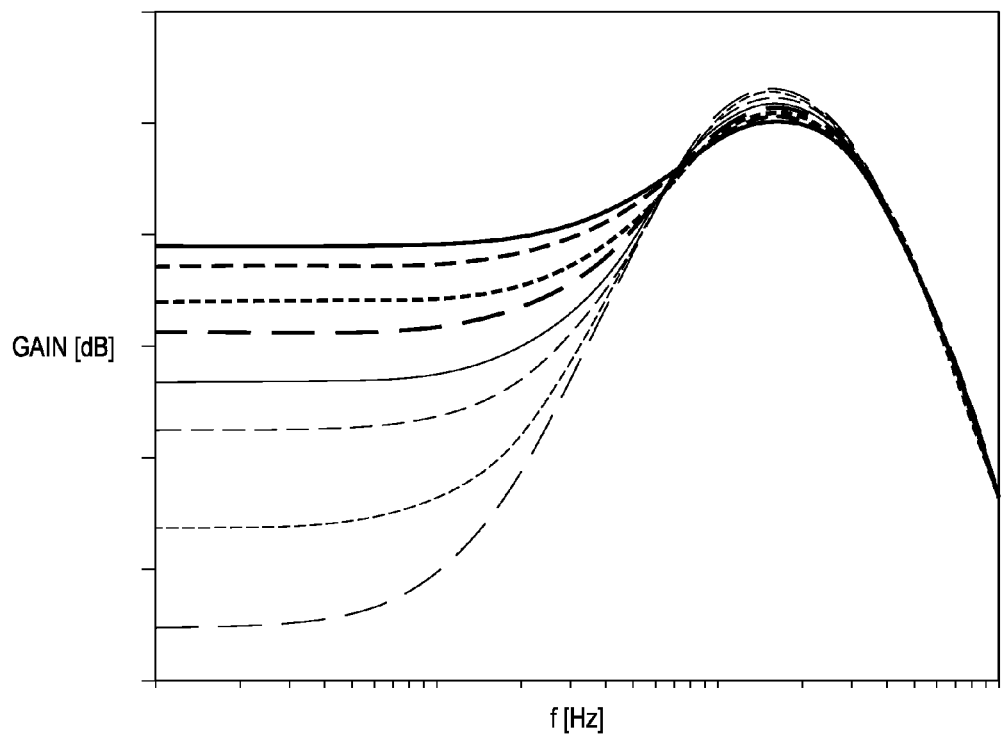
FIG. 1B is a diagram of equalizer transfer characteristics of the equalizer 10 of FIG. 1A.
Figure 2A:
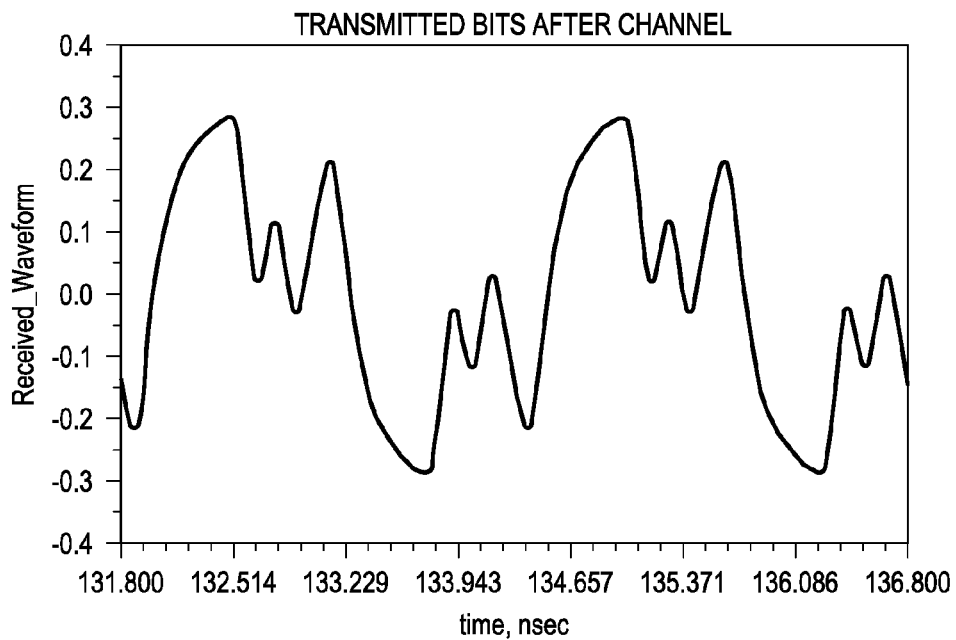
FIG. 2A is an exemplary diagram of a data sequence before equalization.
Figure 2B:
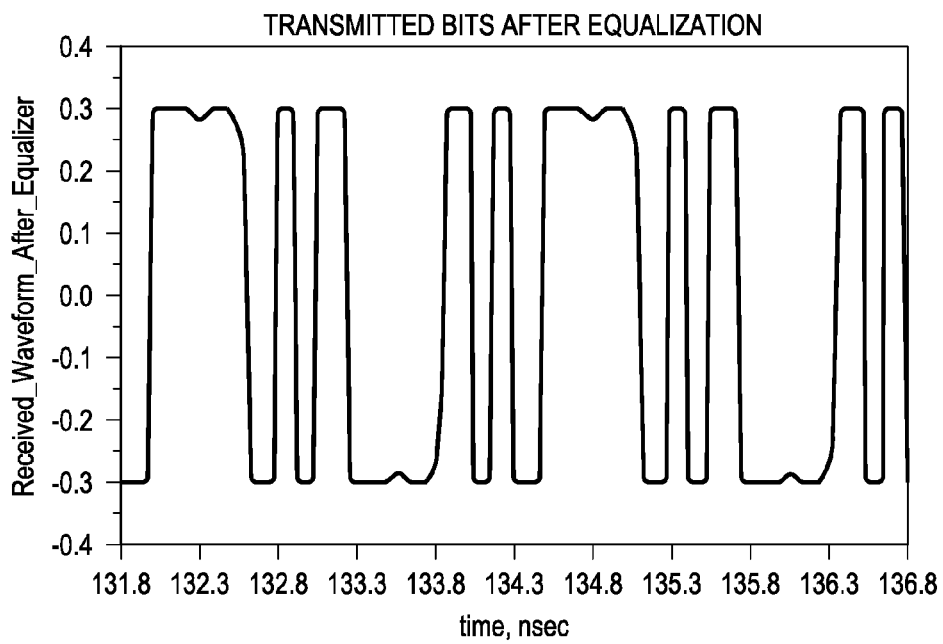
FIG. 2B is a diagram of the data sequence of FIG. 2A after equalization.
Figure 3:
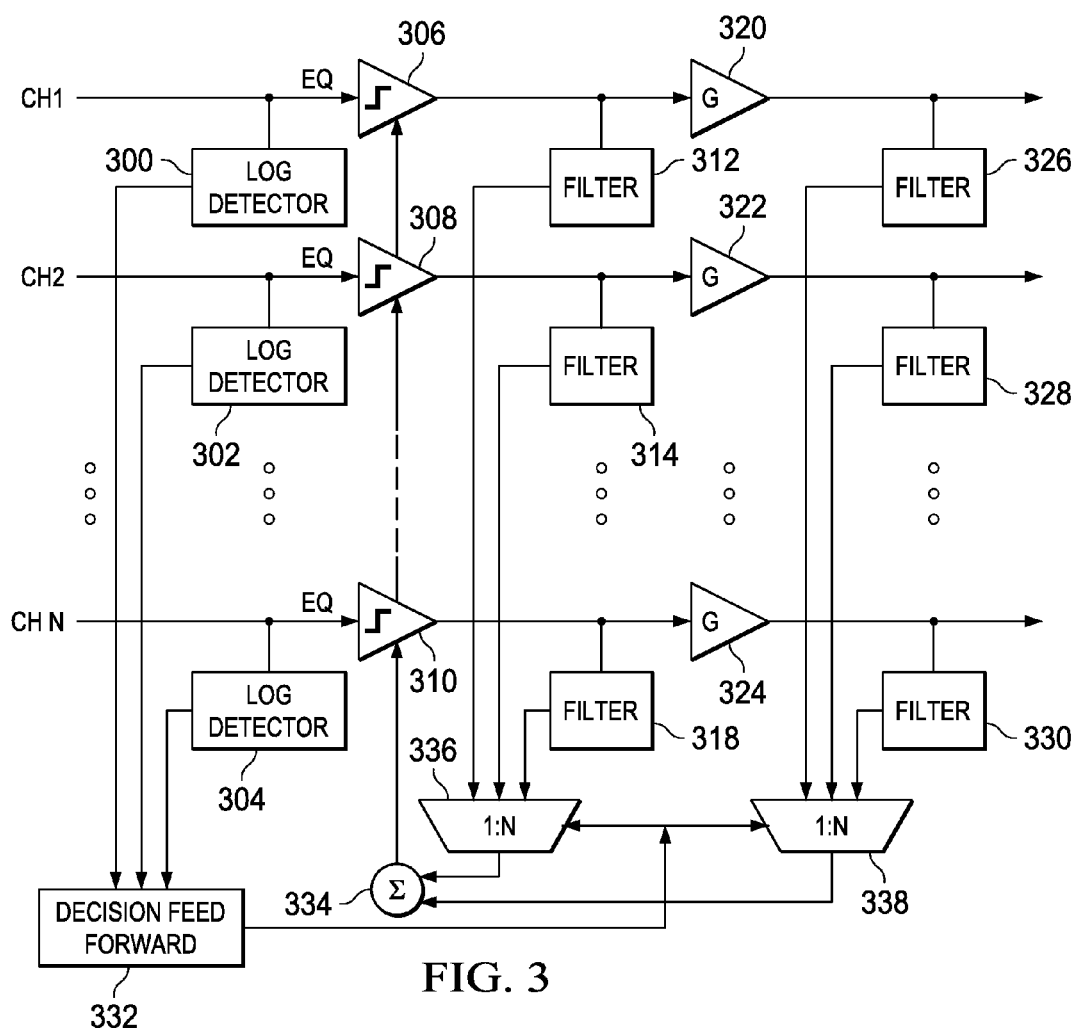
FIG. 3 is a circuit diagram of a first embodiment of a serial data communication circuit of the present invention.

Referring to FIG. 3, there is a circuit diagram of a first embodiment of a serial data communication circuit of the present invention. Here and in the following discussion, one of ordinary skill in the art having access to the instant specification will appreciate that embodiments of the present invention may be applied to analog, digital, or mixed mode applications. The communication circuit is arranged to receive serial data over N channels, where N is a positive integer. The channels may include multiple leads of a High-Definition Multimedia Interface (HDMI) cable, multiple leads of a Digital Versatile Disc (DVD) cable, circuit board leads, or other serial media. The circuit includes N equalizer circuits 306-310 that are coupled to receive serial data on respective channels 1–N and produce equalized serial data. The equalized serial data is applied to filter circuits 312-318, which produce respective first correction signals that are applied to selection circuit 336. The equalized serial data is also applied to N respective amplifiers 320-324, which produce equalized and amplified serial data. The equalized and amplified serial data is applied to filter circuits 326-330, which produce respective second correction signals that are applied to selection circuit 338.

Figure 5:
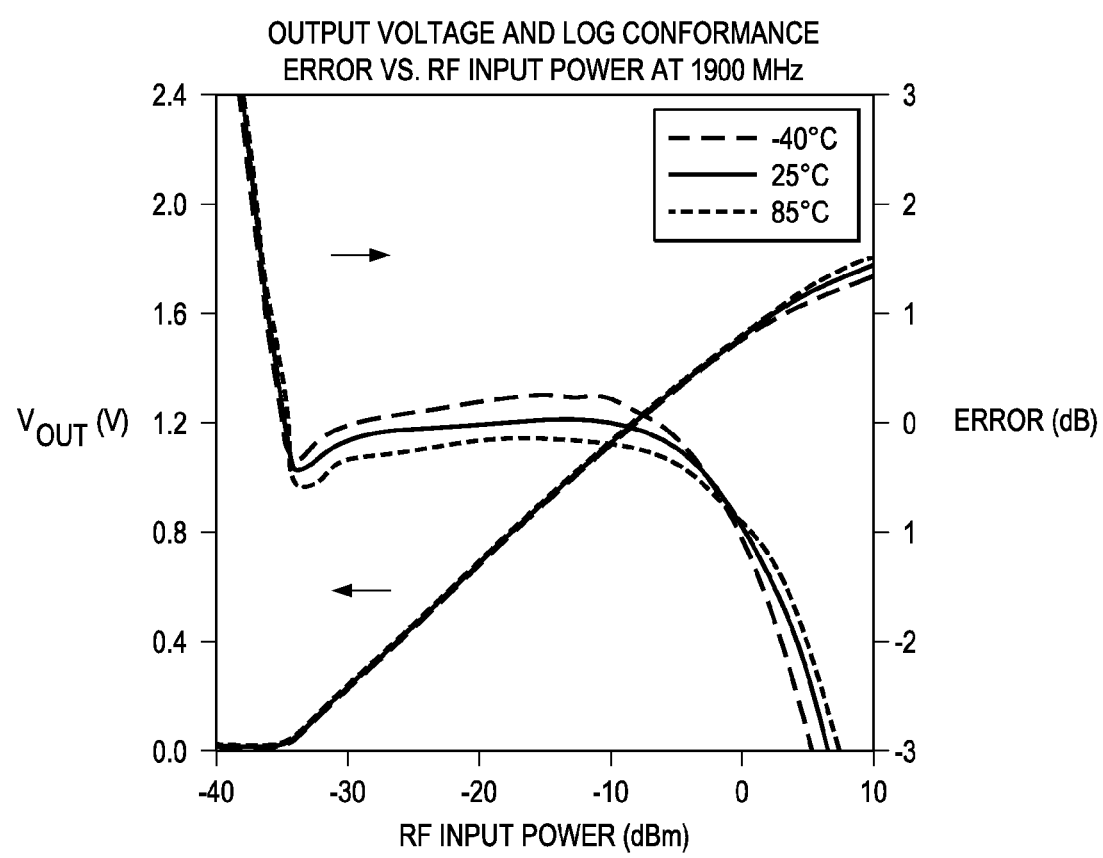
FIG. 5 is a diagram of output voltage of a log detector circuit (Texas Instruments Incorporated LMH2110) as a function of input power.

The communication circuit also includes N log detector circuits 300-304 that are coupled to receive serial data on the N respective channels. Each log detector circuit produces a respective power signal that indicates a power level of the serial data signal of the respective channel. Log detector circuits such as 300-304 are well known to those of ordinary skill in the art. By way of illustration, FIG. 5 shows an output signal of an LMH2110 log detector circuit manufactured by Texas Instruments Incorporated. The log detector circuit produces a substantially linear power signal ($V_{OUT}$) over a predetermined logarithmic range of RF input power. Other log detector circuits such as the LT5538, manufactured by Linear Technology Corporation, are comparable.

Power signals from the N log detector circuits 300-304 are applied to decision feed forward circuit 332. Decision feed forward circuit 332 compares the power signals to predetermined power thresholds and stores a select signal. In a preferred embodiment of the present invention, the select signal corresponds to the channel having the least power. Alternatively, the select signal may correspond to an average of two or more power signals. The select signal is applied to select circuits 336 and 338. Select circuit 336 responsively selects one of the first correction signals from filters 312-318 and applies the selected correction signal to sum circuit 334. Likewise, select circuit 338 responsively selects one of the second correction signals from filters 326-330 and applies the selected correction signal to sum circuit 334. Sum circuit 334 adds the correction signals and applies the sum to equalizer circuits 306-310. The equalizer circuits responsively adjust their pass characteristics to approximately complement the channel characteristic.

In operation, serial data is received by the communication circuit over the N respective channels. Equalizer circuits 306-310 equalize the serial data according to a currently selected correction signal. Filters 312-318 sample the equalized serial data to determine signal attenuation over a first design bandwidth. For example, if high frequency components of serial data are attenuated by a respective channel, a correction signal is generated to alter the equalizer characteristic for that channel. Amplifier circuits 320-324 amplify the equalized serial data. Filters 326-330 sample the equalized and amplified serial data to determine signal attenuation over a second design bandwidth. The second design bandwidth, for example, may extend correction beyond the first design bandwidth and generate a second set of correction signals for respective channels.

Log detector circuits 300-304 generate respective power signals indicating the power level of serial data on respective channels 1–N. The power signals are applied to decision feed forward circuit 332. Decision feed forward circuit 332 is programmed with predetermined threshold values. These predetermined threshold values prequalify the serial data for adaptation by equalizer circuits 300-304. For example, if the range of power signals is substantially unchanged from previous levels, the stored selection signal remains unchanged. However, if the range of power signals varies significantly, then the stored select signal is updated to select different correction signals. The stored select signal is then applied to selection circuits 336 and 338 to select correction signals that optimize serial data equalization.

The present invention offers several advantages over equalization circuits of the prior art. First, the equalization is based on power of the received serial data as measured by each log detector circuit. Second, the decision feed forward circuit stores a select signal that may remain relatively unchanged until received power levels change. Thus, equalizer characteristics need not be frequently updated. Third, the log detector circuits do not require special training sequences. Fourth, correction signals produced by the dual filter sets 312-318 and 326-330 monitor a broad range of frequencies to optimize equalization. Finally, the decision feed forward circuit may be activated at power up or by software during normal circuit operation for maximum flexibility.

Figure 4:
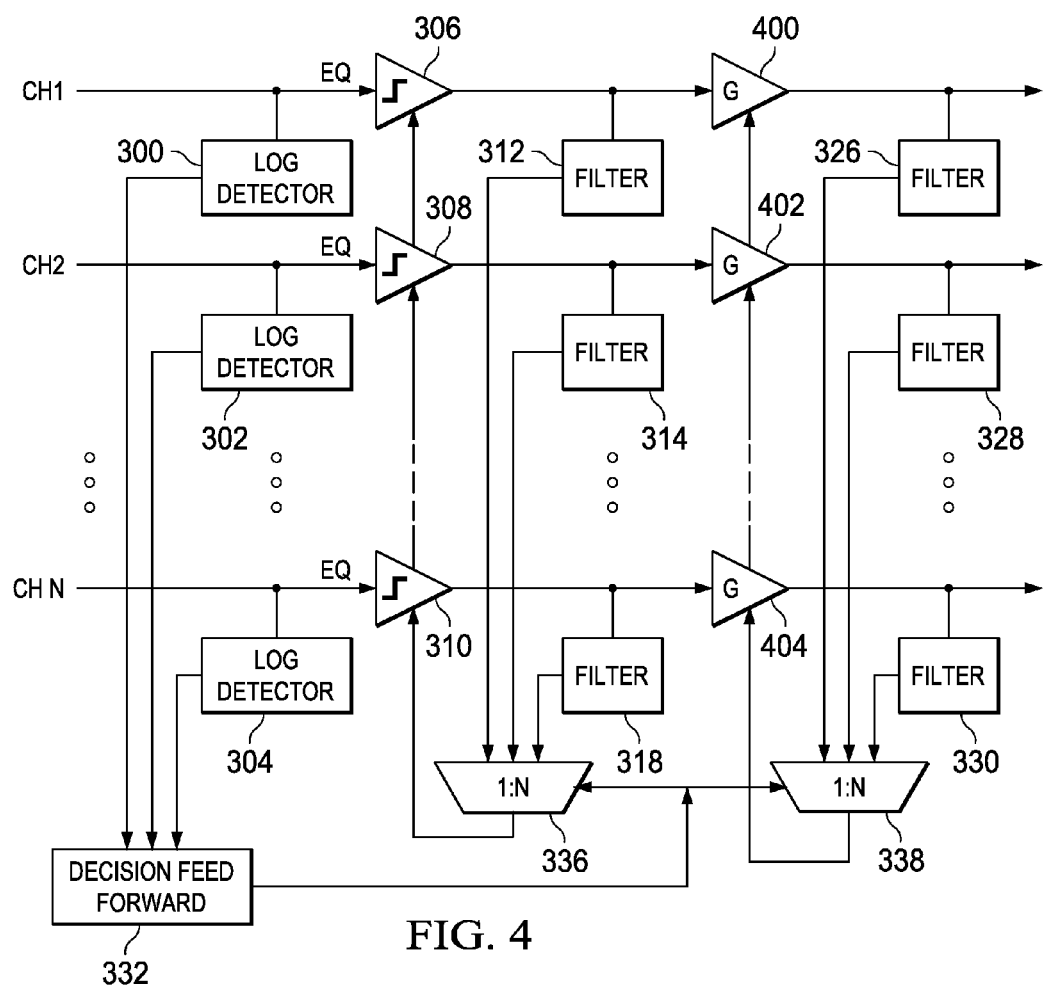
FIG. 4 is a circuit diagram of a second embodiment of a serial data communication circuit of the present invention.

Turning now to FIG. 4, there is a second embodiment of the present invention. The second embodiment is similar to the first embodiment of FIG. 3, and the same reference numerals are used to indicate substantially the same circuit elements. Sum circuit 334, however, is eliminated. Correction signals from filters 312-318 are applied to selection circuit 336 as previously described. The selection circuit 336 selects one of these correction signals in response to the select signal and applies it to equalizer circuits 306-310. Variable gain amplifier circuits 400-404 replace respective amplifier circuits 320-324 (FIG. 3). Correction signals from filters 326-330 are applied to selection circuit 338 as previously described. The selection circuit 338 selects one of these correction signals in response to the select signal and applies it to variable gain amplifiers 400-404. This embodiment of the present invention provides all the advantages of the first embodiment of FIG. 3. Additionally, the embodiment of FIG. 4 advantageously permits independent control of equalization circuits 306-310 and variable gain amplifiers 400-404.

Still further, while numerous examples have thus been provided, one skilled in the art should recognize that various modifications, substitutions, or alterations may be made to the described embodiments while still falling within the inventive scope as defined by the following claims. Other combinations will be readily apparent to one of ordinary skill in the art having access to the instant specification.

What is claimed is:

1. A method of equalizing a data signal, comprising:
receiving a plurality of data signals;
producing a plurality of power signals indicating a power level of each respective data signal;
producing a select signal in response to the plurality of power signals;
selecting a first correction signal from a first plurality of correction signals in response to the select signal;
selecting a second correction signal from a second plurality of correction signals in response to the select signal;
equalizing the plurality of data signals in response to the first and second correction signals to produce a respective plurality of equalized data signals;
amplifying the plurality of equalized data signals to produce a respective plurality of amplified and equalized data signals; and
producing the second plurality of correction signals from a respective second plurality of filter circuits in response to the amplified and equalized data signals.

2. The method of claim 1, further comprising producing the first plurality of correction signals from a respective first plurality of filter circuits in response to the plurality of data signals.

* * * * *